May 2, 1961  A. W. SERIO  2,982,577

HANDLE APPARATUS

Filed March 4, 1959

*INVENTOR.*
Anthony W. Serio
BY
Shoemaker + Mattare
*ATTYS*

# United States Patent Office 2,982,577
Patented May 2, 1961

2,982,577

HANDLE APPARATUS

Anthony W. Serio, 1704 Caton Ave., Elmira, N.Y.

Filed Mar. 4, 1959, Ser. No. 797,191

11 Claims. (Cl. 294—31.2)

The present invention relates to a new and novel handle apparatus, and more particularly to a spring locked handle apparatus adapted to fit various sized containers.

Containers such as pitchers and the like commonly made of plastic, glass, or similar material, are often manufactured today without an integral handle means, and accordingly, there is a great demand for various types of handle apparatus which can be mounted upon such containers in a simple and effective manner, and which will provide a very sturdy and non-slipping finished arrangement.

A particular problem in this connection is the fact that many different sized containers are made, and in addition, the diameters or outside circumferences of the containers may vary within appreciable amounts due to the manufacturing tolerances. It therefore becomes necessary to provide a handle apparatus which is universal in nature in that it is adapted to be rigidly clamped to containers of varying diameter or outer periphery dimension.

Not only must the handle fit such varying sized containers, but it must be in effect automatically adjusting, and in addition, must also provide a neat and attractive finished appearance in order to make the finished product commercially acceptable.

The present invention successfully solves the problems involved in furnishing such handle apparatus with the provision of a container encircling band which is split and formed of a suitable flexible material such as thin-sheet aluminum or the like, the opposite end portions of the band including outwardly extending ears which project approximately normally to the adjacent portions of the band. The band is dimensioned such that for the particular container on which it is adapted to be utilized, the ears are normally spaced from one another as well as the adjacent end portions of the band.

A handle member is provided including a portion having an opening formed therethrough, this opening extending from an outer surface which is normally disposed adjacent the outer surface of an associated container and is complementary in shape thereto. The ears formed at opposite end portions of the band extend through the opening in the handle member, and the outer end portions of the ears are reversely turned and project laterally away from one another to provide a lip portion at the outer end of each ear.

Each ear is also provided with a louver member which prior to assembly is flush with the adjacent ear portion, and is defined by a series of slits formed through the ear. After the ends of the ear are extended through the opening in the handle member, the lips are pinched toward one another deforming the lips toward the adjacent handle portions and forcing the louver portions of the ears out of the plane thereof such that they project inwardly toward one another.

Prior to such deformation of the lips and louvers, a flat compression spring is mounted between the ears and is adapted to bear against the outer surface of the associated container.

After the compression spring is inserted in position, the louvers are deformed inwardly such that they are adapted to engage the outer surface of the spring and prevent withdrawal of the spring from the apparatus. The pinching force applied to the lips actually locks the entire handle apparatus rigidly to the associated container such that the handle member, the band, and the container become in effect an integral unit, the compression spring serving to take up any slack in the band and to automatically adjust the apparatus for containers of varying peripheral dimensions.

It is apparent that an arrangement according to the present invention is very simple, involving a minimum of components, and is extremely compact, and at the same time the device may be very quickly assembled in a simple manner. A recess is also provided in the handle member for receiving the lips at the ends of the ears to provide an attractive finished appearance wherein the lips are substantially flush with the adjacent surface of the handle member.

An object of the present invention is to provide a new and novel handle apparatus which is especially adapted to fit various sized containers, and automatically adjust itself for snugly fitting containers of varying outer dimensions.

Another object of the invention is the provision of a handle apparatus which provides a very attractive finished appearance.

A further object of the invention is to provide a handle apparatus which can be quickly and easily assembled.

Still another object of the invention is to provide handle apparatus which is quite simple and inexpensive, employing a minimum amount of components arranged in a compact manner, and yet which is very sturdy and reliable in operation.

Other objects and many attendant advantages will become more apparent when considered in connection with the specification and accompanying drawing, wherein.

Figure 1:
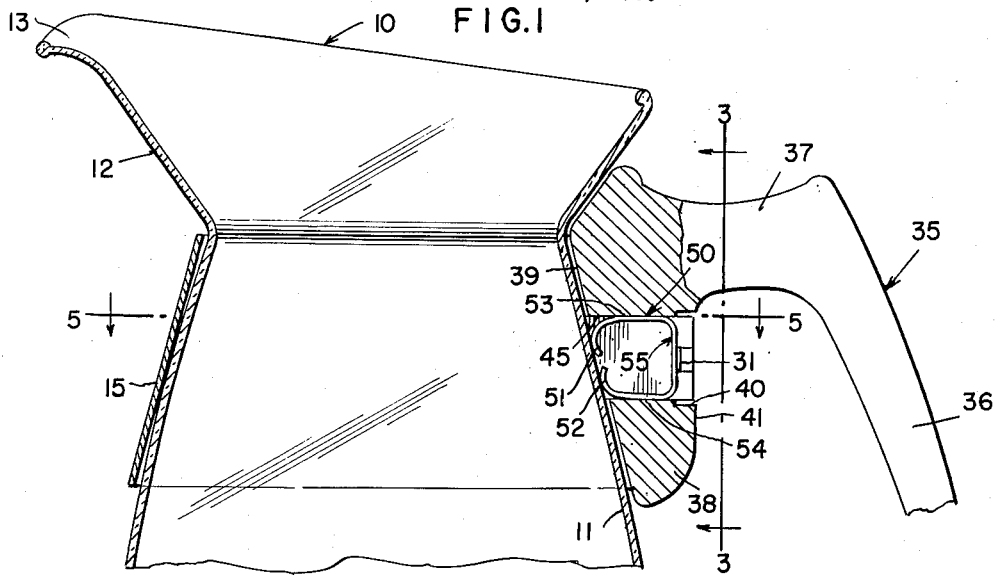
Fig. 1 illustrates the handle apparatus in operative position about the outer surface of the container; portions being in section.

Referring now to the drawing wherein like reference characters designate corresponding parts throughout the several views, there is shown in Fig. 1 a pitcher indicated generally by reference numeral 10 which may be constructed of suitable material such as glass or plastic and the like, the pitcher having a downwardly and outwardly tapering sidewall 11 having an upwardly and outwardly tapering top wall portion 12 defining a pouring spout 13 at one side thereof. A band 15 is disposed in surrounding relationship to the upper portion of wall 11, the upper portion of the band terminating at the lower end of upper wall portion 12, and the band 15 being urged into clamping engagement with the outer surface of the wall 11 in a manner hereinafter set forth. It will be noted that the band is substantially frustro-conical in configuration in order to provide a configuration which is substantially complementary to that of the outer surface of the container.

Figure 2:
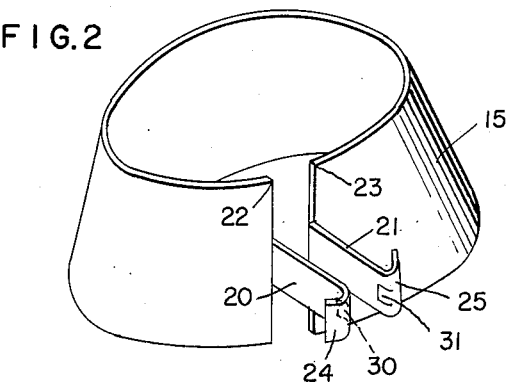
Fig. 2 is a perspective view of the band of the present invention.

Referring now to Fig. 2 of the drawing, band 15 may be more clearly seen, the band being substantially circular in plan, the opposite ends of the band having formed integral therewith outwardly projecting ears 20 and 21 which extend substantially normally to the end portions 22 and 23 respectively of the band. The band may be formed of a suitable flexible material such as aluminum or the like, and as clearly seen in Fig. 2, the width of ear portions 20 and 21 are of less width than the band.

The outer ends of the ears 20 and 21 are reversely turned so as to provide lips 24 and 25 respectively which project laterally away from one another. Louver portions 30 and 31 are formed integrally with each of ears 20 and 21 respectively, the louvers each being defined by three cuts or slits formed through the ears, the louver portions being attached to the ears closely adjacent to the lip portions 24 and 25 and normally lying flush in the plane of ears 20 and 21 prior to installation of the device.

Figure 3:
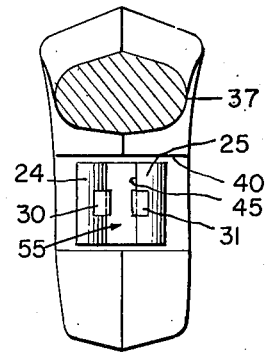
Fig. 3 is a sectional view taken along line 3—3 of Fig. 1 looking in the direction of the arrows.

Referring to Figs. 1 and 3, a handle member indicated generally by reference numeral 35 includes a portion 36 adapted to be grasped in the hand, a bridging portion 37, and an attaching portion 38 having a lateral surface 39 which is substantially complementary to the configuration of the outer surface of the container such that it is adapted to fit closely adjacent to the container. A laterally extending recess 40 is provided in surface 41 of the handle member, and extends from one side to the other side thereof. An opening 45 is formed through the handle member, this opening extending from surface 39 to the recess 40 and providing an opening completely through portion 38 of the handle member.

In assembling the device, the band 15 is first placed in operative position about the container, the band having sufficient flexibility to permit the band to be opened to the degree necessary to fit about the container. The ear portions are then brought together sufficiently such that they may be slipped through the opening 45 in the handle member into the position shown in Fig. 4 of the drawing, wherein ears 20 and 21 project through opening 45 with lips 24 and 25 positioned within recess 40 formed in portion 38 of the handle. After the ears of the band are in the position shown in Fig. 4, the ears are allowed to expand against the side walls of the opening 45 in the handle member such that the ears are spaced from one another. When in such spaced position, a spring indicated generally by reference numeral 50 is inserted between the ears.

As seen most clearly in Fig. 1, spring 50 is a flat spring preferably formed of spring steel of the like, this spring being bent so as to fit within opening 45, the spring including opposite end portions 51 and 52 which seat against the outer surface of the container, a portion 53 which seats against the upper wall of opening 45, a portion 54 which seats against the lower wall of opening 45, and a portion 55 which is disposed opposite to the end portions 51 and 52. When in the position shown in Fig. 1, spring 50 serves as a compression spring which applies force against the outer surface of the container and exerts an outward force along portion 55 thereof.

Referring again to Fig. 4, the spring 50 is shown as inserted in operative position between the ears 20 and 21. Since spring 50 is under compression in this position, it is necessary to maintain the spring in such operative position. This is accomplished by the louver portions 30 and 31 formed integral with the ears 20 and 21, respectively, but in the position shown in Fig. 4 these louvers are still flush with the associated ears.

Figure 4:
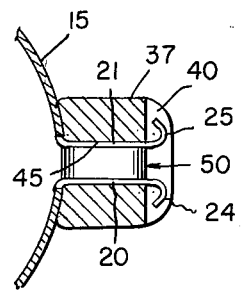
Fig. 4 is a view of a portion of the apparatus prior to the completed assembly thereof.

When the device is in the position shown in Fig. 4, a pinching force is applied to the outer end edges of lips 24 and 25 tending to pinch the two lips toward one another. This pinching force simultaneously urges the outer end edges of the lips toward the adjacent surfaces of the handle member on either side of opening 45, and also urges the louver members out of the plane of the associated ears or into the position shown in Fig. 5.

Figure 5:
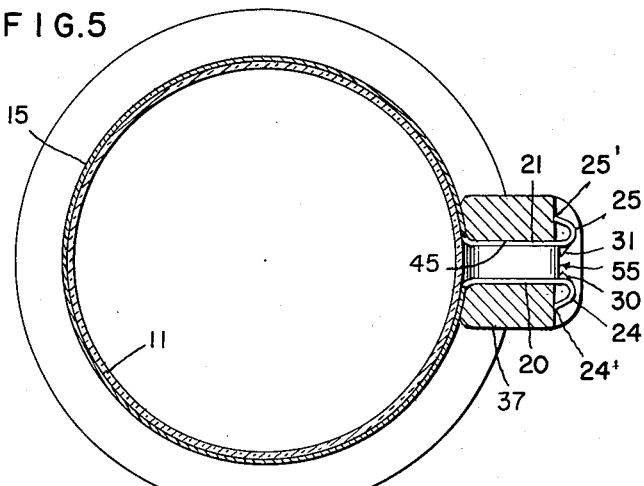
Fig. 5 is a sectional view taken along line 5—5 of Fig. 1 looking in the direction of the arrows and shows the device in assembled operative position.

As seen in Fig. 5, the end edges 24' and 25' of lips 24 and 25 respectively have been urged into contact with the handle member on either side of opening 45, and louver portions 30 and 31 have been urged out of the plane of the associated ears such that they extend obliquely to the plane of the ears and extend inwardly toward one another. In this position, louvers 30 and 31 engage the rear surface 55 of spring 50, thereby positively retaining the compression spring in operative position such that it will create reaction forces against the outer surface of the container and against louvers 30 and 31, thereby causing the band 15 to be tightened about the container and locking the entire handle apparatus to the container.

It is evident that when in the assembled position as shown in Figs. 1 and 5, the compression spring not only positively locks the band in position, but actually serves as an automatic adjustment which compensates for variations in the outer periphery of the container for insuring that the handle apparatus is firmly locked to the container. While a single louver has been shown as formed in each ear 20 and 21, it is evident that a plurality of louvers could be provided in each ear if desired, and in addition, it is evident that the ears 20 and 21 need not necessarily be of less width than the associated band, depending on the particular design desired.

It will also be noted that as seen especially in Fig. 1, when the lips have been deformed into operative position, they are disposed within the recess 40 of the handle member, and are substantially flush with the adjacent surface 41 whereby a very neat and attractive finished appearance is provided. Of course, the handle member may be made of any suitable material, such as plastic or the like, and the material of the handle may be opaque if desired in order to conceal the spring 50.

It is apparent from the foregoing that there is provided a new and novel handle apparatus which is universal in nature in that it is adapted to fit containers of varying dimension. The apparatus automatically adjusts itself to different sized containers and securely locks the handle apparatus in place. The device provides a very neat and attractive finished appearance and can be quickly and easily assembled. The apparatus employs a minimum of components in a compact arrangement, and yet provides a very sturdy and rigid unit.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:
1. Handle apparatus comprising band means, a handle member having an opening formed therein, the opposite end portions of said band means projecting through said opening, said opposite end portions being spaced from one another when in operative position within said opening, the outermost ends of said end portions extending laterally outwardly of said opening for preventing withdrawal of said end portions from the handle member, resilient compression means disposed between said opposite end portions and adapted to engage the outer surface of a container, and means on said opposite end portions projecting laterally thereof for engaging said resilient compression means for retaining the compression means in operative position.

2. Apparatus as defined in claim 1, wherein said means on said end portions for engaging the compression means comprises louver portions formed integral with said end portions and projecting inwardly toward one another.

3. Handle apparatus comprising a band member including outwardly extending ears formed adjacent opposite ends thereof, a handle member including an opening formed through a portion thereof, said ears projecting through said opening, a lip portion formed at the outer end of each of said ears, said lip portions extending laterally away from one another and being adapted to engage portions of said handle member on either side of said opening for preventing withdrawal of said ears through said opening, said ears being spaced from one another when in operative position within said opening, compression spring means disposed between said ears and having a portion adapted to engage the outer surface of a container, each of said ears including an integral louver portion, said louver portions extending inwardly toward one another for engaging another portion of said compression spring means for maintaining the spring means in operative position.

4. Apparatus as defined in claim 3, wherein said spring means comprises a flat elongated spring, the opposite end portions of which are positioned adjacent one another and are adapted to engage against the outer surface of a container.

5. Apparatus as defined in claim 3, wherein said band member is substantially annular, and said ears extend approximately normally to the adjacent end portions of the band.

6. Handle apparatus comprising a band member adapted to substantially encircle the outer surface of a container, said band member including outwardly extending ears at the opposite end portions thereof, a handle member having an opening formed through a portion thereof, said ears projecting through said opening and normally being spaced from one another when received in said opening, a reversely turned lip formed at the outer end of each of said ears, and at least one louver member formed integral with each of said ears closely adjacent the lip thereof whereby the louver and lip are adapted to be simultaneously moved upon the application of pressure to said lips, a compression spring member received between said ears and being adapted to engage the outer surface of a container, the outer end edges of said lips being adapted to engage adjacent portions of said handle member when in operative position, and the inner end edges of said louver members being adapted to engage a portion of said spring means when in operative position, whereby the handle member and the band member may be locked as a unit to the outer portion of a container.

7. Apparatus as defined in claim 6, wherein said handle member is provided with a recessed portion adjacent said opening therethrough, said lips being received in said recessed portion for providing a smooth finished appearance.

8. Apparatus as defined in claim 6, wherein said ears are of less width than said band, and said ears extending approximately normally to the adjacent end portions of the band.

9. Handle apparatus comprising container gripping means, said container gripping means including a pair of spaced outwardly projecting portions, a handle member superposed over said outwardly projecting portions, and a compression spring means adapted to be inserted between said outwardly projecting portions when said handle member is superposed thereover, said compression spring means including a first portion adapted to engage the outer surface of a container, said compression spring means also including a second portion engaging a portion of each of said outwardly projecting portions to provide the sole means for operatively connecting said spring means to said handle means, whereby said compression spring means exerts a force outwardly against said outwardly projecting portions for taking up slack in said container gripping means.

10. Handle apparatus comprising container gripping means, said container gripping means including a pair of spaced outwardly projecting portions, handle means including a hole formed therein, said outwardly projecting portions extending within said hole, said outwardly projecting portions including laterally extending portions engaging portions of said handle means for retaining said container gripping means in operative position, and resilient compression means adapted to be inserted between said outwardly projecting portions when said portions have been positioned in said hole, said resilient compression means including a first portion adapted to engage the outer surface of the container, said resilient compression means also including a second portion engaging means on said outwardly projecting portions whereby said compression means exerts a force outwardly against said outwardly projecting portions for taking up slack in said container gripping means.

11. Apparatus as defined in claim 10, wherein said laterally extending portions of said outwardly projecting portions comprise integral louver members projecting inwardly toward one another.

References Cited in the file of this patent

UNITED STATES PATENTS

| | | |
|---|---|---|
| 2,205,819 | Mattoon | June 25, 1940 |
| 2,428,942 | Poglein | Oct. 14, 1947 |
| 2,434,122 | Reichold | Jan. 6, 1948 |
| 2,554,761 | Walder | May 29, 1951 |
| 2,556,441 | Reichart | June 12, 1951 |
| 2,620,955 | Elder | Dec. 9, 1952 |
| 2,790,669 | Crawford | Apr. 30, 1957 |
| 2,854,279 | Serio | Sept. 30, 1958 |